July 6, 1937.　　　J. AMREIN, JR　　　2,085,722

SAW TOOTH FOR CUTTING STONE

Original Filed Nov. 29, 1932

INVENTOR
JACOB AMREIN, JR.
BY
ATTORNEY

Patented July 6, 1937

2,085,722

UNITED STATES PATENT OFFICE 2,085,722

SAW TOOTH FOR CUTTING STONE

Jacob Amrein, Jr., Atlanta, Ga.

Application November 29, 1932, Serial No. 644,756
Renewed May 1, 1936

11 Claims. (Cl. 125—22)

The invention relates to apparatus for the cutting of stone such as marble, limestone, and the like, and more particularly to the saw tooth element utilized therein. As generally employed, these teeth comprise separate removable and replaceable units adapted to be secured in a rotatable disk or blade, and consists of a special composition of an abrasive in powdered form and a bonding material therefor.

It has been found that in the use of these teeth the horse-power consumed depends upon a number of factors, among which are the character of the material to be cut and the cutting speed. The coarseness, form and hardness of the abrasive particles and the particular nature of the bonding material constituting the tooth are also important factors. One of the greatest factors, however, in the horse-power consumption, is the percentage of cutting surface—a saw with a continuous rim of abrasive material consuming considerably more power, other conditions being equal, than one in which a plurality of separated teeth are provided rather than a continuous rim. The fewer the numbers of cutting teeth in a blade, the less will be the power consumed; but the number of teeth is limited by other considerations than horse-power. For example, if an insufficient number of teeth be provided, the teeth will break as the stress on each individual tooth will become too great; and, furthermore, the cut will not be true and the finish will be ragged.

It is an object of the present invention to afford a saw-tooth unit of bonded abrasive material wherein the actual cutting surface of each individual tooth is reduced without materially weakening the tooth structure, and the disadvantage of breakage of a tooth and a ragged cut and finish therewith in the use of the same is obviated and whereby also in the use of the same the power consumption is materially reduced.

This is attained, not by making the individual teeth thinner, as they must be at least equal to the thickness of the carrying blade as well as to conform to considerations of breaking strength; but a tooth is slotted transversely to provide a plurality of independent cutting portions or sections between the front and rear cutting edges or faces of the original tooth, or by providing transverse grooves over the sides of a tooth. These grooves may be filled with a more or less resilient or elastic material, as may also be the space between tooth sections where a tooth is slotted transversely.

The nature of the invention, however, will best be understood when described in connection with the accompanying drawing, in which.

Figure 1:
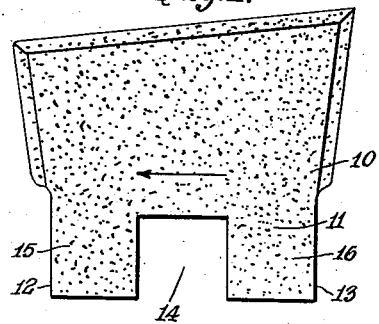
Fig. 1 is a front elevation, and Fig. 2 a bottom view, of a novel tooth unit embodying my invention.

Referring to the drawing, 10 designates the body portion of an individual tooth unit and which is adapted to be suitably seated and held in a rotatable blade or like member (not shown) and in any well known or special manner. In accordance with the usual practice, a tooth is composed of a powdered abrasive such as carborundum, emery, flint, etc., which is held together by a suitable binder or cementing liquid or paste such as rubber, shellac, or like more or less resilient bonding material, with suitable modifying agents such as sulfur in the case of rubber and resin in the case of shellac.

The actual cutting portion which is preferably tapered and protrudes beyond the edge of the holding blade (not shown) is indicated at 11, the front edge of the tooth being indicated at 12 and the rear edge at 13.

Figure 2:
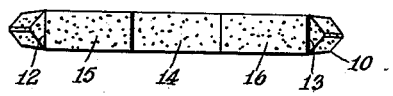

In accordance with the invention, provision is made to interrupt the surface of the tooth between these two edges, more particularly along the sides of the tooth, so as to reduce appreciably the effective cutting surface. This may be accomplished in various ways, for example, reference being had to Figs. 1 and 2 of the drawing, the active tooth portion 11 may be slotted transversely of the tooth or at right angles to the direction of motion of the tooth, as indicated by the arrow. This affords one or more intermediate slots, as the slot 14, between the edges 12 and 13 of a tooth, the adjacent sections 15 and 16 still serving for the cutting operation but with a discontinuous cutting edge or surface, and the body portion 10 of the tooth retaining its original form and material. The reduction in the cutting surface of each individual tooth is attained with a minimum of reduction in the strength of a tooth; but it may be desirable to reinforce the plurality of tooth sections of an individual tooth, for example in the manner set forth in Fig. 3 of the drawing. In this embodiment, the slot 20 provided between the tooth sections 21 and 22 is filled with a more or less elastic and resilient compound 23, for example, the binder or bonding material for the abrasive as utilized in compounding the tooth composition; and such compound may be further retained by fitting an enlarged recess 24 at its inner end of the slot. In the case of a rubber composition, the filling may be moulded in the slot, and in the case of a shellac composition poured hot and in a semi-liquid state.

Such elastic and interposed material serves as a cushion so that when cutting with the tooth sections, a cutting edge, in striking against the material to be cut, will permit a section to yield slightly without breaking, the stress being absorbed in said interposed elastic member and partly transmitted to the adjoining section therethrough.

Figure 4:
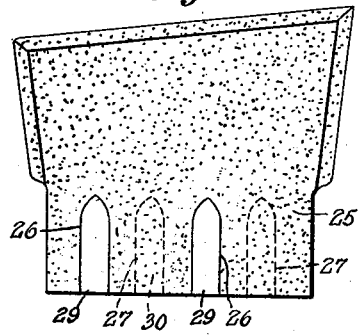
Fig. 4 is a front elevation, and Fig. 5 a bottom view, illustrating a modification in the manner of reducing a cutting surface of a tooth by providing transverse grooves therein.
Figure 5:
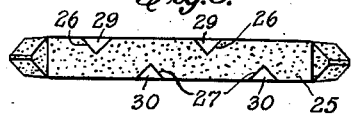
Figure 6:
Fig. 6 is a bottom view illustrating a different form of transverse groove as provided in the tooth surface.

A further means of reducing the cutting surface of a tooth, which at the same time provides for clearance of abraded matter and introduction of water to the cutting surface, is indicated in Figs. 4 and 5. In this particular embodiment the cutting portion 25 is provided over its opposite faces or sides with a plurality of transverse triangular grooves 26 and 27, respectively, and preferably staggered relatively to one another. The form of these grooves may be varied to assume any suitable shape, for example, they may be semi-circular as indicated at 28, Fig. 6 of the drawing; and I do not wish to be restricted to the particular shapes of these grooves indicated nor to the number shown, nor to the particular arrangement set forth of one set of grooves with respect to the other.

Figure 3:
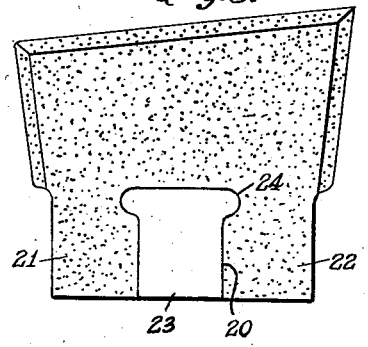
Fig. 3 is an elevation illustrating a modification in a tooth of the nature shown in Figs. 1 and 2.

These various grooves may be filled, if required for strengthening a grooved tooth, with a compound similar to that set forth in connection with the slot 20, Fig. 3, and retained thereby by moulding or pouring the particular composition therein. For example, grooves 26 may be filled with the bonding material 29 and the grooves 27 with the like bonding material 30, Fig. 5; and, similarly, the grooves 28, Fig. 6 of the drawing, with the bonding material 31. While this bonding material serves also to reinforce the tooth at the removed portions, it is not essential in the cutting action.

I claim:

1. An individual, removable and replaceable saw-tooth adapted for mounting in a cutter element, said tooth consisting of bonded abrasive material and comprising a plurality of successive cutting sections separated by a transverse slot, and an elastic material filling said slot.

2. An individual, removable and replaceable saw-tooth adapted for mounting in a cutter element, said tooth consisting of bonded abrasive material and comprising a plurality of successive cutting sections separated by a transverse slot, and rubber filling said slot.

3. An individual saw-tooth adapted for mounting in a cutter element, said tooth consisting of abrasive material having transverse grooves extending upwardly from its outer face over the side faces of the tooth, the grooves over one face being in staggered relation to those of the other face, and elastic material filling said grooves.

4. An individual saw-tooth adapted for mounting in a cutter element, said tooth consisting of abrasive material having transverse grooves extending upwardly from its outer face over the side faces of the tooth, the grooves over one face being in staggered relation to those of the other face, and rubber held within the respective grooves.

5. An individual, removable and replaceable saw-tooth adapted for mounting in a cutter element, said tooth consisting of abrasive material having transverse grooves extending upwardly from its outer face over the side faces of the tooth whereby the continuity of its cutting surface is interrupted, and elastic material filling said grooves.

6. An individual, removable and replaceable saw-tooth for mounting in a cutter element, said tooth consisting of abrasive material transversely interrupted over the side faces of the tooth whereby the continuity of its cutting surface is interrupted, and elastic material filling the interruptions.

7. An individual, removable and replaceable saw-tooth having an upper portion for mounting in a cutter element and a cutting portion projecting downwardly therefrom, said tooth consisting of abrasive material held together by a binder and having a face of said cutting portion interrupted on a continuous edge by a groove extending upwardly from the lower edge, to the upper part of said cutting portion of said tooth, and said tooth being reinforced inwardly of said interrupted face.

8. An individual, removable and replaceable saw-tooth having an upper portion for mounting in a cutter element and a cutting portion projecting downwardly therefrom, said tooth consisting of abrasive material held together by a binder and having a face of said cutting portion interrupted on a continuous edge by a groove extending upwardly from the lower edge, to the upper part of said cutting portion of said tooth and said tooth being reinforced inwardly of said interrupted face, said reinforcement comprising material similar to said binder.

9. An individual, removable and replaceable saw-tooth having an upper portion for mounting in a cutter element and a cutting portion projecting downwardly therefrom, said tooth consisting of abrasive material held together by a binder and having a face of said cutting portion interrupted on a continuous edge by a groove extending upwardly from the lower edge, to the upper part of said cutting portion of said tooth and said tooth being reinforced inwardly of said interrupted face, said reinforcement comprising a web of said binder and abrasive material integral with said tooth.

10. Stone cutting elements consisting of a mass of abrasive material having a cutting edge and side faces and having grooves extending from said cutting edge over the side faces whereby the continuity of the cutting surface is interrupted, and elastic material in said grooves.

11. A cutting element of bonded abrasive material having a cutting edge and side faces extending therefrom, said side faces being interrupted by slots extending from said cutting edge, said slots being filled with an elastic reinforcing material.

JACOB AMREIN, Jr.